Nov. 12, 1935.  E. N. MEAKIN  2,020,510

PELLET FORMING MACHINE

Filed May 15, 1933  3 Sheets-Sheet 1

INVENTOR.
EDGAR N. MEAKIN
BY Charles O Bruce
ATTORNEY

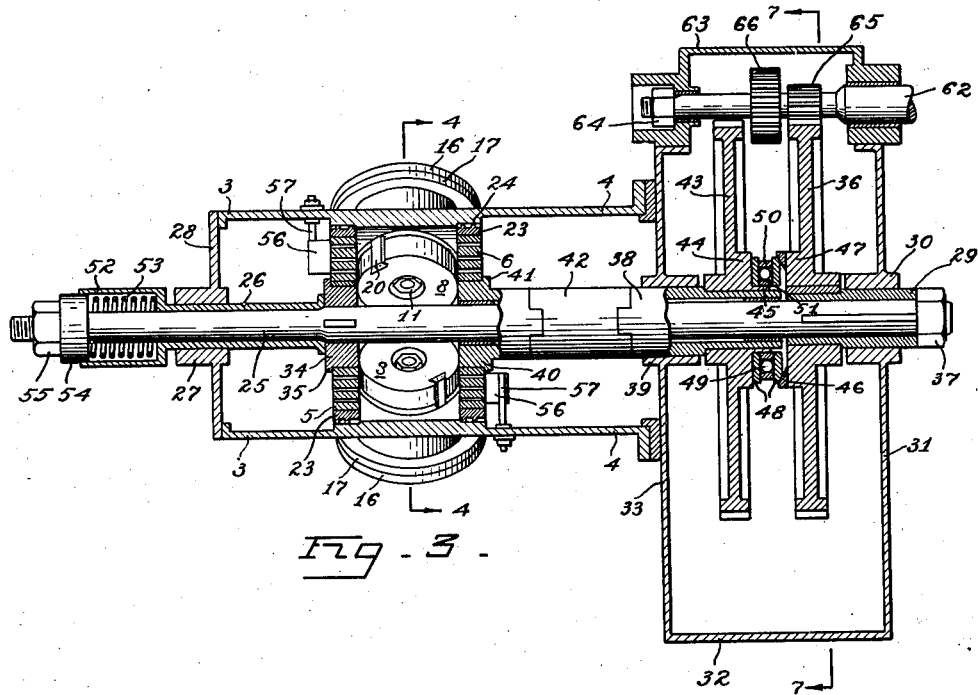
Fig-3.
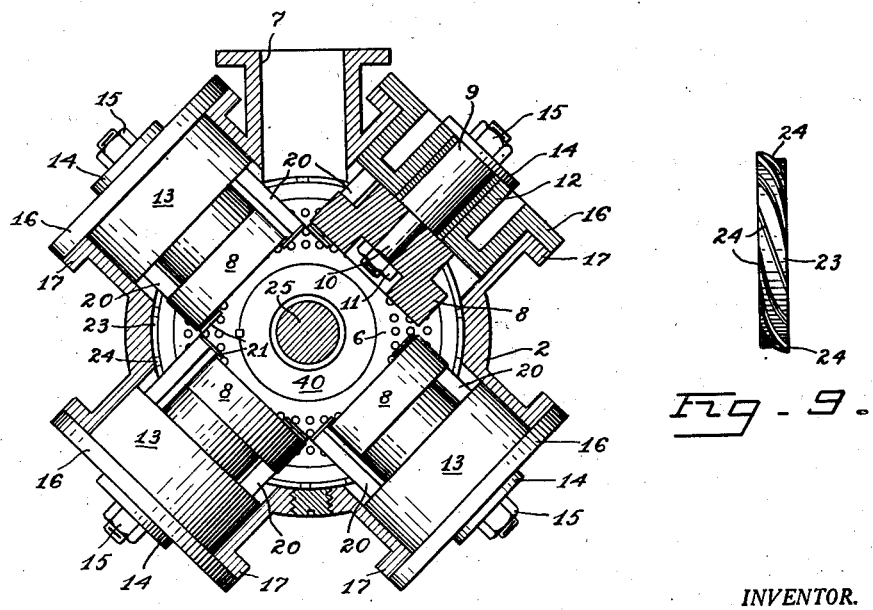
Fig-4.
Fig-9.
INVENTOR.
EDGAR N. MEAKIN
BY Charles O Bruce
ATTORNEY Nov. 12, 1935.  E. N. MEAKIN  2,020,510
PELLET FORMING MACHINE
Filed May 15, 1933  3 Sheets-Sheet 3

INVENTOR.
EDGAR N. MEAKIN
BY Charles O Bruce
ATTORNEY

Patented Nov. 12, 1935

2,020,510

UNITED STATES PATENT OFFICE 2,020,510

PELLET FORMING MACHINE

Edgar N. Meakin, Berkeley, Calif.

Application May 15, 1933, Serial No. 671,044

30 Claims. (Cl. 107—8)

My invention relates to an improved machine for compressing moldable material, and is particularly applicable for compressing or molding meals, mashes and the like, whereby the same may be formed into pellets of suitable size for use as poultry and cattle food.

An object of my invention is the provision of a compact and durable machine, having a large capacity, and which can be economically manufactured.

Another object of my invention is the provision of a pellet forming machine in which parts may be speedily removed for repair and replacement, without causing undue tie-up of the machine.

Another object of the invention is the provision of a machine employing a pair of die plates through each of which material is compressed to form pellets, each die plate being so mounted that it can be readily reversed when worn on one side, so as to position the other side for use.

A further object of the invention is the provision of a pellet forming machine wherein lateral stress upon the structure for compressing and forcing material through dies, is equalized.

An additional object of the invention is the provision of a machine, of the class described, employing a pair of dies with rollers therebetween for forcing material through said dies, each of said dies being supported in yieldable contact with the rollers.

The invention possesses numerous additional objects and advantageous features, some of which, with the foregoing, will become apparent upon perusal of the following description of my invention. It is to be understood that I do not limit myself to this disclosure of the species of my invention, as I may adopt variant embodiments thereof within the scope of the claims.

Referring to the drawings:

Figure 3 is a horizontal sectional view, partly in elevation, of the pellet forming structure and the drive mechanism therefor.

Figure 4 is a vertical sectional view taken in a plane indicated by line 4—4 of Figure 3, part of the structure being shown in elevation to clearly illustrate the construction.

Figure 9 is a side elevation of the threaded ring adjacent the periphery of the die.

Figure 1:
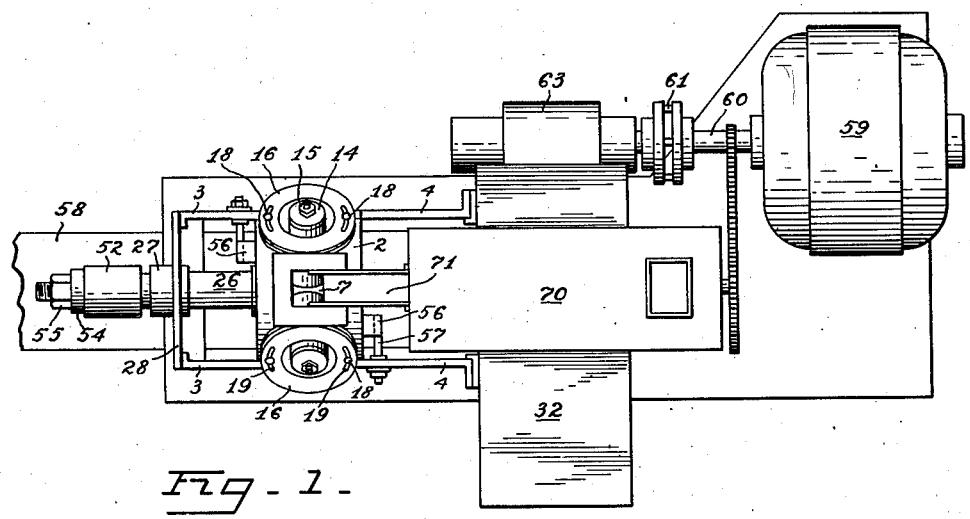
Figure 1 is a top plan view of the apparatus of my invention.

In terms of broad inclusion, my invention comprises a pair of dies having a space therebetween. A housing is provided for enclosing such space and to form with the dies a chamber into which material may be fed for extrusion purposes. Rollers are mounted between the dies to compress and force material through apertures therein; and knives are mounted adjacent the outer faces of the dies for severing the extruded strings of material into pellets of suitable size. Each of the dies is of such construction and is so mounted that it may be readily and quickly reversed in position if one side becomes worn through continued contact with the rollers; also, the dies are so mounted that each is held in yieldable contact with the rollers. Suitable scrapers are provided adjacent the converging surfaces of the rollers and the dies for spreading the material uniformly over the face of the die; and their mounting is such as to permit of adjustment relative to the face of the die. The rollers are so mounted that each of them may be readily and easily withdrawn from the housing, if their replacement or repair is required. A rotatable shaft is provided for supporting each of the dies; and means are also provided for rotating the shafts and consequently the dies, in opposite directions, so as to cause relative rotation between the dies and rollers for effecting the extrusion of the material through the dies.

With reference to the preferred embodiment of my invention, I have chosen for the purposes of illustration the machine shown by the drawings. It comprises a housing 2 of substantially cylindrical shape, having extending side portions 3—3 and 4—4. A pair of relatively thick but flat and centrally apertured die plates 5 and 6 are provided for closing the ends of the housing. These die plates are vertically positioned in the housing and form therewith a cylindrical chamber adapted to receive, through a flanged opening 7, in the top thereof, the material for compressing and molding.

Interposed between the die plates 5 and 6 are a plurality of radially disposed rollers 8, each contacting with the adjacent faces of the dies. Preferably four rollers equi-spaced about the axis of rotation of the dies, are provided. As illustrated in Figure 4, a shaft 9 is provided for each roller and is preferably formed with an end 10 of reduced diameter, upon which the roller is mounted. A lock nut 11 threaded onto end 10 of the shaft is utilized for securing the roller against end-wise withdrawal therefrom. Shaft 9 is preferably journaled for rotation in hub 12 of a cylindrical-shaped bearing block 13 of larger diameter than that of the roller. A lock washer 14 and a lock nut 15 threaded onto the outer end of shaft 9 are provided for locking the shaft, roller and bearing block together in a unitary assembly. The bearing block 13 is seated in an aperture in the side wall of housing 2 and is provided, adjacent its outer end, with an outturned flange 16, removably held against a similar flange 17 on the housing, by means of a pair of oppositely disposed bolts 18. These bolts pass through arcuate slots 19 in flange 16 and are threaded in flange 17 of the housing; and the slots are so positioned as to permit, upon loosening of the bolts, a limited turning of the bearing block, for a purpose to be later described.

From the foregoing description of the roller and bearing block assembly, it is seen that each such assembly can be speedily and easily removed from the housing for replacement or repair, by simply removing bolts 18 and withdrawing the entire assembly as a unit through its respective aperture in housing 2.

Means are provided for spreading a layer of material of uniform thickness upon the face of the dies immediately in advance of the converging surfaces of the roller and the dies, including a pair of scrapers 20, for each roller. With reference to Figures 3 through 6, each pair of scrapers is preferably fixedly mounted on the inner end of the bearing block 13, adjacent opposite sides thereof; and each scraper extends past the periphery of the roller 8, with one edge in scraping contact therewith, so as to remove any material adhering thereto. The other edge of each of the scrapers is so positioned with respect to the faces of the die plates 5 and 6, as to spread the material in a uniform layer thereupon for compression by the roller. In order to restrain the material from crowding into the space between the side of the scraper and the roller and upon the layer of material spread by the scraper, a plate 21, secured to the outer end of the scraper by means of the bolts 22 and having one side overlying the end of the roller, is provided.

It is apparent that in mounting the scrapers in the manner just pointed out, each pair thereof may be simultaneously adjusted with reference to the surface of the respective die plates to regulate the thickness of the layer of material spread thereby, by turning the bearing block in the direction and to the position desired and there locking the same by means of the bolts 18. It is also to be observed that each pair of scrapers may be speedily removed from the housing for repair or replacement, by withdrawing the bearing block 13 on which it is mounted, from the housing, in the manner previously pointed out.

Means are provided for preventing the leakage of material past the peripheries of the die plates. With reference to Figures 3, 4, 5, 6 and 9, this means is preferably a ring 23, splined or otherwise removably mounted on the periphery of each of the die plates, and having threads 24 on its outer face adapted to bear against the inner wall of housing 2. These threads are so directed that upon rotation of the die plate any material attempting to crowd therepast will be restrained and returned to the cylindrical chamber between the die plates.

Provision is made for supporting the die plates, rotating them in opposite directions and urging them into contact with the rollers. In this connection, a horizontally positioned shaft 25 is provided which preferably passes through the central apertures of both die plates and is supported, adjacent one end, in a sleeve 26 which is journaled in a bearing 27 formed in a support plate 28 secured to the outer end portions 3—3 of the housing 2. The opposite end of this shaft is supported, in a sleeve 29 which is journaled in a bearing 30 formed in a side wall 31 of a gear casing 32, to the opposite side wall 33 of which the outer ends 4—4 of the housing are secured. It is apparent that the side wall 33 of the casing provides a vertical support for one end of the housing structure; the other end of said structure being supported from beneath by a vertical brace 33'.

Seated in the central aperture of the die plate 5, and supporting such die plate for rotation with the shaft, is a die block 34 having its inner face flush with that of the die plate and being formed with an out-turned flange 35, adjacent its outer face, adapted to bear against the outer face of the die plate. The die block is splined to both the shaft and the die plate and axial movement therebetween is permitted. A gear wheel 36 is splined to the inner end of the sleeve 29 and this sleeve in turned is splined to shaft 25, on which it is firmly retained by means of the lock nut 37.

The support for the die plate 6 is preferably a hollow shaft 38 journaled about the shaft 25 and supported near its middle in a bearing 39 formed in the side wall 33 of the gear casing 32. This shaft is formed with an end 40 of enlarged diameter adapted to seat within the central aperture of the die plate. The die plate is splined to the end 40 of the shaft for rotation therewith; and to restrain the die plate from moving longitudinally inward upon the shaft, a shoulder 41 is provided, against which the outer face of the die plate abuts. The hollow shaft is also formed with a removable section 42 for a purpose to be later described. A gear wheel 43, of the same diameter as gear wheel 36, is splined to the hollow shaft adjacent the other end thereof. Hub 44 of the gear wheel 43 is formed with an end 45 of reduced diameter, to provide a support for a thrust bearing.

The structure of this thrust bearing includes a ring 46 having a conical side surface and bearing against the inner end of hub 47 of the gear wheel 36, a pair of centrally apertured plates 48, one of which is adapted to bear against the conical side surface of ring 46, and the other of which is adapted to bear against the end of hub 47, ball bearings 49 adapted to roll against the adjacent faces of plates 48, and an outer and an inner ring 50 and 51 positioned between the plates 48 and adapted to provide a race for the ball bearings 49.

It is desirable in a device of this character that the die plates be held in yieldable contact with the rollers in order to avoid destruction of parts, should particles of unmoldable matter be accidentally fed into the machine and caught between the roller and dies. Means for accomplishing this advantageous result are therefore provided, and include the sleeve 26 adapted to bear against the outer face of the die block 34 and having provided on its outer end a cup 52, a coiled spring 53 adapted to be housed in said cup, a compression washer 54 of proper diameter to compress the spring within the cup, and a lock nut 55 threaded on the end of shaft 25 and adapted to bear against the washer to compress spring 53 and lock the entire assembly together. It is apparent that when the spring 53 is compressed, its effect will be to push inwardly upon the sleeve 26 and urge, through the die block 34, the die plate 5 upon the rollers, and at the same time to force the shaft 25 in the opposite direction, thereby transmitting through the thrust bearing structure a pull upon the shaft 42, to draw the die plate 6 upon the rollers. Lateral stress exerted by one die plate upon one side of the rollers is therefore equalized by an opposing lateral stress exerted upon the opposite sides of the rollers by the opposite die plate, thereby reducing the wear upon the bearing structure of the rollers to a minimum.

In case it is desired to remove the die plates 5 and 6 for replacement or reversal, this can be quickly and easily done by removing the lock nut 55 and washer 54 and withdrawing shaft 25 until its outer end is past the removable section 42 of shaft 38, which section may then be removed. Thereupon, knives (for a purpose to be hereafter described) having been first removed, the dies can be readily withdrawn from the housing 2, and their repair, reversal and replacement effected.

Knives 56 are provided for severing the material into suitable pellets as it is forced through the die plates. The knives are preferably made of flexible steel and are of such shape that they will not readily break upon slight outward movement of the die plates. Each knife is provided with a handle 57 which is removably secured in any suitable and well known manner, to the side portions of the housing 2, adjacent the outer faces of the die plates.

Figure 2:
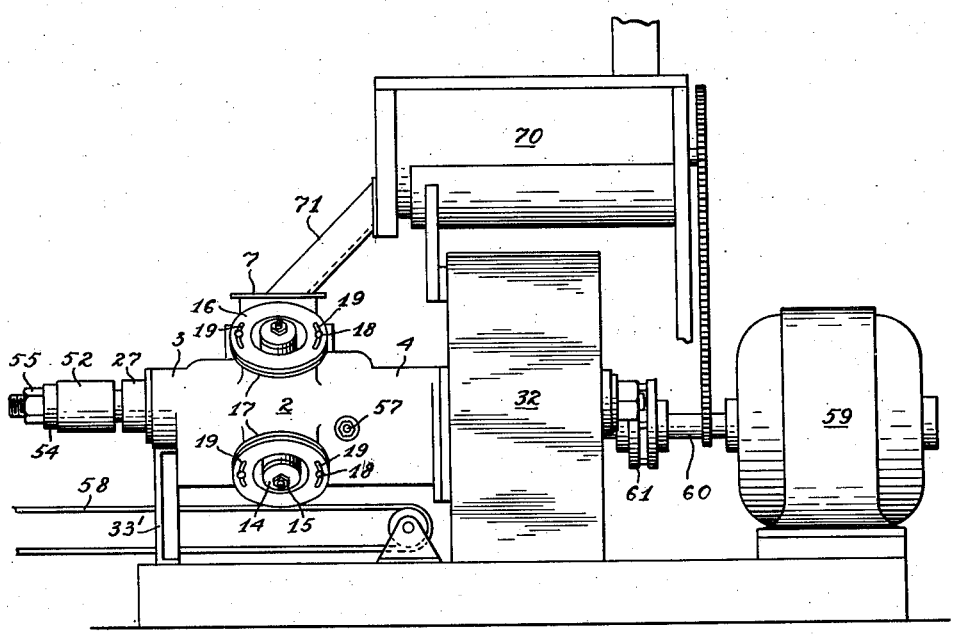
Figure 2 is a side elevation thereof.
Figure 5:
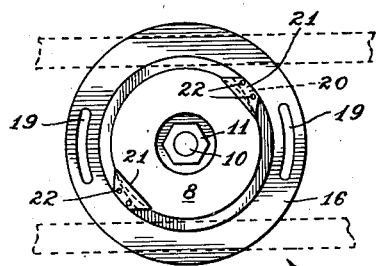
Figure 5 is an elevational view of the inner end of one of the rollers, its supporting bearing block and adjacent scrapers; the position of the dies being shown in dotted lines to illustrate the positioning of the scrapers relative thereto and to the roller.
Figure 6:
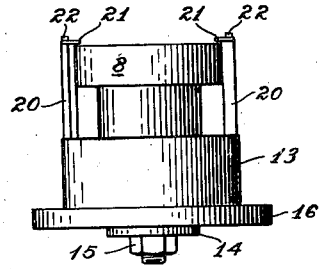
Figure 6 is a side elevation looking in the direction of arrow A of Figure 5.

When the pellets are formed, they may be collected in any suitable manner, such as by an endless conveyor 58 (see Figures 1 and 2) passing beneath the housing 2.

As seen from the preceding description, die plate 5 is mounted for rotation with shaft 25, die plate 6 is mounted for rotation with shaft 38, and the shafts are mounted so as to permit their rotation in opposite directions. This is accomplished by turning the gear wheel 36, splined to shaft 25, in one direction, and the gear wheel 43, splined to shaft 38, in the opposite direction.

Figures 7, 8:
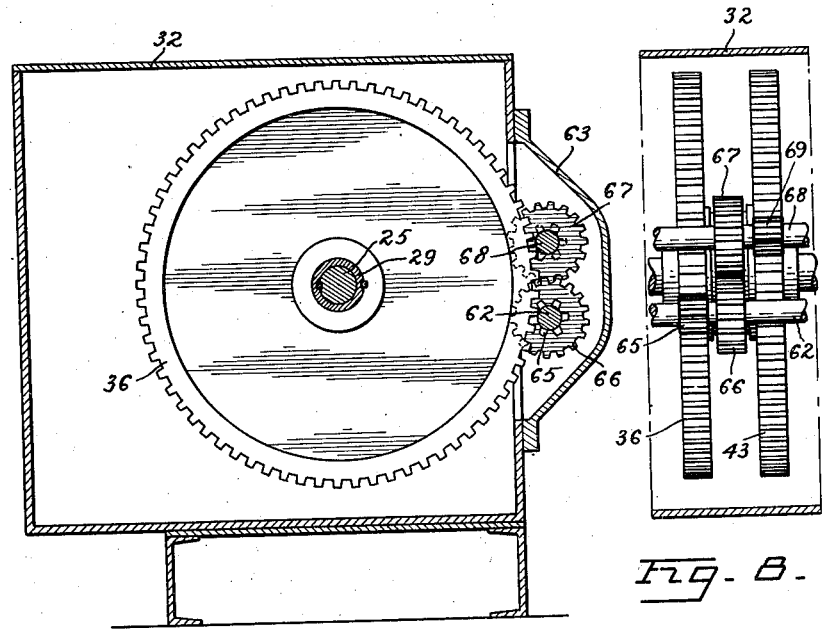
Figure 7 is a vertical sectional view of the drive mechanism, taken in a plane indicated by line 7—7 of Figure 3.
Figure 8 is an end elevation of the driving gear mechanism. A portion of the shafts are broken away and a fractional part of the adjacent gear casing is shown in cross section.

The driving means includes a suitable primemover 59, such as an electric motor, positioned adjacent the outer side of the gear casing 32, and having a rotatable shaft 60 connected, through a flexible coupling 61 of any well known design, to a horizontal shaft 62. This shaft is journaled in suitable bearings formed in the end walls of a substantially semi-annular housing 63, which is secured to one end of the gear casing 32, adjacent a suitable opening therein, through which the peripheries of the gear wheels 36 and 43 project. A lock nut 64, threaded on the outer end of shaft 62, is provided for restraining end-wise play of the shaft. The shaft 62 is provided with gear teeth 65 (see Figures 3, 7 and 8) adapted to mesh with the gear wheel 36 to effect rotation thereof. A gear 66 is secured to shaft 62 adjacent the gear teeth 65 and is adapted to mesh with a second gear 67 secured to a shaft 68. This shaft is disposed above shaft 62 and has its opposite ends journaled in suitable bearings in the end walls of the housing 63, and is provided with gear teeth 69 adapted to mesh with the gear wheel 43 to effect rotation thereof, but in the opposite direction to that of gear wheel 36.

In the formation of pellets for use as livestock food, it is sometimes desirable to use more than one type of feed, uniformly blended, in order to produce a product of balanced food values; and in the pelleting of such blends or mixes, the application of heat thereto enchances compression and molding. For the above purposes, a combined heater and mixer 70, of any well known construction and in common use, is provided. The material properly blended and heated is delivered from the combined heater and mixer 70 through the chute 71 to the opening 7 in the housing 2, through which it passes to the pelleting mechanism.

Although, in the preferred construction of my device, relative movement between the die plates and rollers is effected by rotation of the die plates in opposite directions, it is apparent that the rollers may be rotated and the die plates revolved through contact therewith, or one of the die plates may be rotated, the other held stationary and the rollers mounted for rotation about the axes of the die plates, by any suitable mechanism, all without departing from the spirit of my invention.

I claim:
1. In apparatus of the class described, a pair of dies, a roller disposed for engagement with the adjacent faces of said dies and adapted to compress and force material through apertures in said dies upon rotation thereof, and means for rotating said dies.

2. In apparatus of the class described, a pair of dies, each of said dies being capable of reverse positioning whereby either face thereof may be exposed for use, a plurality of rollers interposed between said dies and adapted to compress and force material through apertures in said dies, and means for rotating said dies.

3. In apparatus of the class described, a pair of die members, a rolling member disposed for engagement with adjacent faces of said die members and adapted to compress and force material through apertures in said die members upon relative movement therebetween, and means for causing said relative movement.

4. In apparatus of the class described, a pair of spaced dies, a housing enclosing the space between the dies, a roller interposed between said dies for compressing and forcing material through apertures in said dies upon relative movement between said dies and roller, and means for causing said relative movement.

5. In apparatus of the class described, a pair of die plates, a plurality of rollers interposed between said die plates and adapted to compress and force material through apertures in said die plates upon rotation thereof, and means for rotating said die plates.

6. In apparatus of the class described, a pair of die plates, a plurality of rollers interposed between said die plates and adapted to compress and force material through apertures in said die plates, resilient means for holding said die plates in contact with said rollers, and means for rotating said die plates.

7. In apparatus of the class described, a shaft, a die mounted for rotation with said shaft, a second shaft positioned adjacent said first mentioned shaft, a second die mounted for rotation with said second shaft, a roller interposed between said dies for compressing and forcing material through apertures in said dies, and means for rotating said shafts.

8. In apparatus of the class described, a shaft, a die mounted for rotation with said shaft, a hollow shaft mounted for rotation on said first mentioned shaft, a second die mounted for rotation with said hollow shaft, means interposed between said dies for compressing and forcing material through apertures in said dies, and means for rotating said shafts.

9. In apparatus of the class described, a shaft, a die mounted for rotation with said shaft and axially movable relative thereto, a hollow shaft mounted for rotation on said first mentioned shaft and axially movable therewith, a second die mounted for rotation with said hollow shaft, a roller interposed between said dies for compressing and forcing material through apertures in said dies, means for holding said dies in yieldable contact with said roller, and means for rotating said shafts.

10. In apparatus of the class described, a housing, a die mounted for rotation in said housing, means for preventing the leakage of material past the periphery of said die, means mounted in said housing and adapted to contact with one face of the die for compressing and forcing material through apertures in said die, and means for rotating said die.

11. In apparatus of the class described, a housing, a die mounted for rotation in said housing, means for preventing the leakage of materials between the outer edge of the die and the housing, said means comprising a ring rotatable with said die and having threads on its outer face adapted to bear against said housing, means mounted in said housing and adapted to contact one face of the die for forcing material through apertures in said die, and means for rotating said die.

12. In apparatus of the class described, a housing, a pair of dies mounted for rotation in said housing, means for preventing the leakage of material between the outer edge of each of said dies and said housing, a plurality of rollers interposed between said dies for compressing and forcing material through apertures in said dies, and means for rotating said dies.

13. In apparatus of the class described, a pair of dies, a roller interposed between said dies for compressing and forcing material through apertures in said dies, means for rotating said dies, a scraper disposed adjacent the periphery of said roller and the face of one of the dies, and means whereby the distance between the face of said die and scraper may be adjusted.

14. In apparatus of the class described, a pair of dies, a roller interposed between said dies for compressing and forcing material through apertures in said dies, means for rotating said dies, a scraper disposed adjacent the periphery of said roller and the face of one of said dies, a second scraper disposed on the opposite side of said roller and adjacent the periphery thereof and the face of the other of said dies, and means for mounting said scrapers for simultaneous adjustment relative to the faces of the respective dies.

15. In apparatus of the class described, a pair of dies, a roller interposed between said dies for compressing and forcing material through apertures in said dies, means for rotating said dies, a pair of scrapers oppositely disposed adjacent the respective converging surfaces of the roller and the dies for regulating the quantity of material compressed and forced through the apertures in said dies, and means for mounting said scrapers for simultaneous adjustment relative to the faces of the respective dies.

16. In apparatus of the class described, a housing having an aperture in the side thereof, a die mounted in said housing adjacent said aperture, a roller disposed for engagement with one face of said die, and means for mounting said roller within the housing for withdrawal through said aperture.

17. In apparatus of the class described, a housing having an aperture in the side thereof, a die mounted in said housing adjacent said aperture, a bearing block in said aperture, means for removably securing said bearing block at the outer end thereof, a shaft journaled in said bearing block, and a roller mounted on said shaft and adapted to engage with one face of said die, the diameter of said roller being less than that of said aperture.

18. In apparatus of the class described, a pair of spaced dies, a housing enclosing the space between the dies, a plurality of radially positioned bearing blocks intersecting said housing adjacent said space, means for removably securing each of said bearing blocks to said housing, a roller carried by each of said bearing blocks and adapted to contact with the adjacent faces of said dies, the diameter of said roller being less than that of the bearing block whereby said roller and bearing block may be withdrawn as a unit from said housing.

19. In an extrusion press, a housing, a die mounted for rotation adjacent one end of said housing, means cooperating with said die and said housing for preventing the leakage of materials between the outer edge of said die and said housing, means mounted in said housing and adapted to contact with one face of the die for compressing and forcing material through apertures in said die, and means for rotating said die.

20. In an extrusion press, a housing, a rotatable die plate positioned adjacent one end of said housing, a roller mounted in said housing and adapted to cooperate with said die plate to compress and force materials through apertures in said die plate, and means for holding said die plate in removable contact with said roller.

21. In an extrusion press, a housing, a rotatable die plate positioned adjacent one end of said housing, a roller mounted in said housing and adapted to cooperate with said die plate to compress and force materials through apertures in said die plate, means for removably securing the die plate at the central portion thereof, and means for holding said die plate in removable contact with said roller.

22. In apparatus of the class described, a pair of dies having opposed apertured faces, means for rotating said dies in parallel planes, and single means cooperating with each of said faces for forcing material through said apertures.

23. In apparatus of the class described, a pair of dies having opposed apertured faces, means for rotating said dies in parallel planes, and single means interposed between said dies for simultaneously forcing material through the apertures in each of said dies.

24. In apparatus of the class described, a pair of dies having opposed apertured faces, means for rotating said dies about a common axis, and means interposed between said dies for directly applying pressure along a line lying perpendicular to the faces of said dies to effect extrusion of material therethrough.

25. In apparatus of the class described, a pair of dies having opposed apertured faces, means for oppositely rotating said dies in parallel planes, and single means cooperating with each of said faces for forcing material through said apertures.

26. In apparatus of the class described, a pair of dies having opposed apertured faces, means for rotating said dies in parallel planes, and means interposed between said dies and actuated by frictional contact therewith upon rotation of said dies for directly forcing material through said apertures.

27. In apparatus of the class described, a pair of dies having opposed apertured faces, means for rotating said dies in parallel planes, single means cooperating with each of said faces for forcing material through said apertures, and means for forming the material into pellets as it is extruded through said dies.

28. In apparatus of the class described, a pair of dies, a roller interposed between said dies for forcing material through apertures in said dies, and means for rotating said dies.

29. In apparatus of the class described, a pair of dies, a roller interposed between said dies for simultaneously forcing material through apertures in each of said dies, and means for rotating said dies in opposite directions.

30. In apparatus of the class described, a pair of dies having opposed apertured faces, means for rotating said dies in parallel planes, and means interposed between said dies and adapted to converge upon the face of each of said dies upon rotation thereof for compressing and forcing material through said apertures.

EDGAR N. MEAKIN.